United States Patent [19]

Singh et al.

[11] Patent Number: 4,597,729
[45] Date of Patent: Jul. 1, 1986

[54] TIRE CURING PRESS AND LOADER

[75] Inventors: Anand P. Singh, Youngstown; Norman R. Knoedler, Salem, both of Ohio

[73] Assignee: NRM Corporation, Columbiana, Ohio

[21] Appl. No.: 778,886

[22] Filed: Sep. 23, 1985

[51] Int. Cl.$^4$ .............................................. B29H 5/02
[52] U.S. Cl. ...................................... 425/38; 425/33; 425/29; 425/150
[58] Field of Search ........................ 425/31, 32, 33, 29, 425/38, 43, 150

[56] References Cited

U.S. PATENT DOCUMENTS

| | | | |
|---|---|---|---|
| 3,396,221 | 8/1968 | Balle et al. | 425/43 X |
| 3,471,895 | 10/1969 | Ulm et al. | 425/38 X |
| 3,487,507 | 1/1970 | Turk | 425/150 X |
| 3,579,736 | 5/1971 | Balle et al. | 425/38 |
| 3,609,812 | 10/1971 | Baier | 425/38 |
| 3,833,324 | 9/1974 | Klopper et al. | 425/31 X |
| 3,936,251 | 2/1976 | Billey | 425/38 |
| 3,989,432 | 11/1976 | Depka | 425/150 X |
| 4,105,379 | 8/1978 | Gaquit | 425/38 X |
| 4,190,406 | 2/1980 | Geck et al. | 425/38 |
| 4,338,069 | 7/1982 | Singh et al. | 425/38 |
| 4,368,015 | 1/1983 | Kawahara et al. | 425/29 |
| 4,391,769 | 7/1983 | Ichikawa et al. | 425/38 X |
| 4,447,385 | 5/1984 | Blosser et al. | 425/38 X |

*Primary Examiner*—J. Howard Flint, Jr.
*Attorney, Agent, or Firm*—Renner, Otto, Boisselle & Lyon

[57] ABSTRACT

A tire curing press with an improved loader includes a shaping or center mechanism which includes a vertically movable well on which is mounted the bottom bead or toe ring. The press includes a loader of improved design affording precision centering and accuracy which is driven for vertical movement by a ball screw and nut drive which positions the green tire concentric with the upper and lower mold sections and over the bottom bead ring. The loader then moves the green tire downwardly until the lower bead of the green tire reaches a predetermined point touching or fairly closely adjacent the elevated bead ring. Simultaneously, an adjustable pad on the loader contacts the tip of an extended rod of a vertically oriented synchronizer piston-cylinder assembly. Concurrently, a sensor is tripped to power the synchronizer piston downwardly and as such piston moves downwardly, the loader follows at a slightly higher speed causing the rotary motor of the ball screw drive to be retarded or stall, thus keeping the loader in contact with the tip of the rod of the synchronizer cylinder assembly. As the synchronizer piston is being powered down, fluid on the underside of such piston is being forced over to the top ports of a pair of bead lift cylinder assemblies causing them to bring the well and thus the lower bead ring down at the same speed as the loader is bringing the tire down. In this manner the green tire and lower bead ring are maintained in constant relationship until the bead ring is seated on the lower mold section. The point of bead ring seating provides a physical stop which in turn blocks the synchronizer piston and rod, and thus the loader from further downward travel. This synchronization is accomplished by making the blind end area of the piston of the synchronizing cylinder assembly twice the equal rod end areas of the pistons of the bead lift cylinders.

33 Claims, 6 Drawing Figures

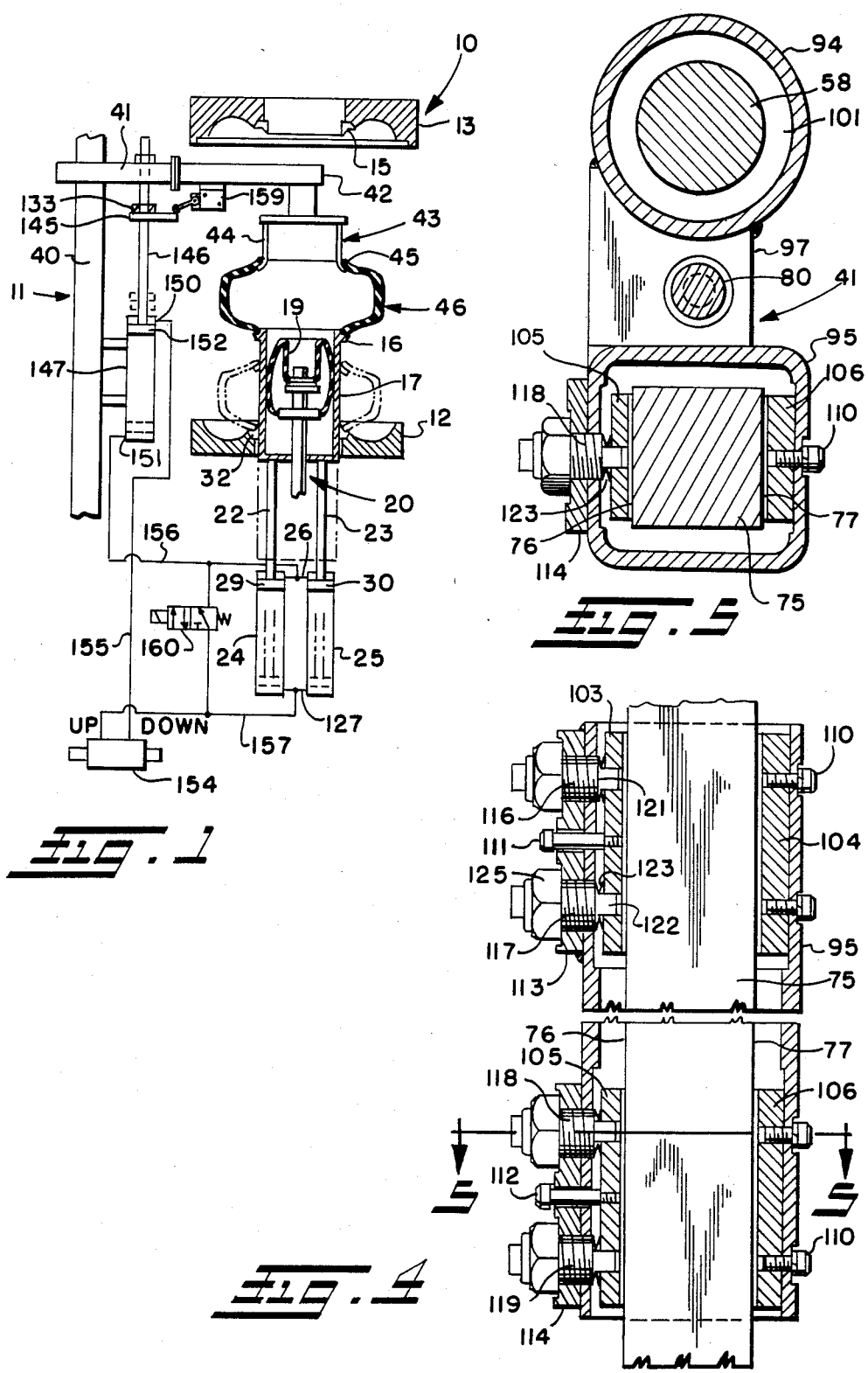

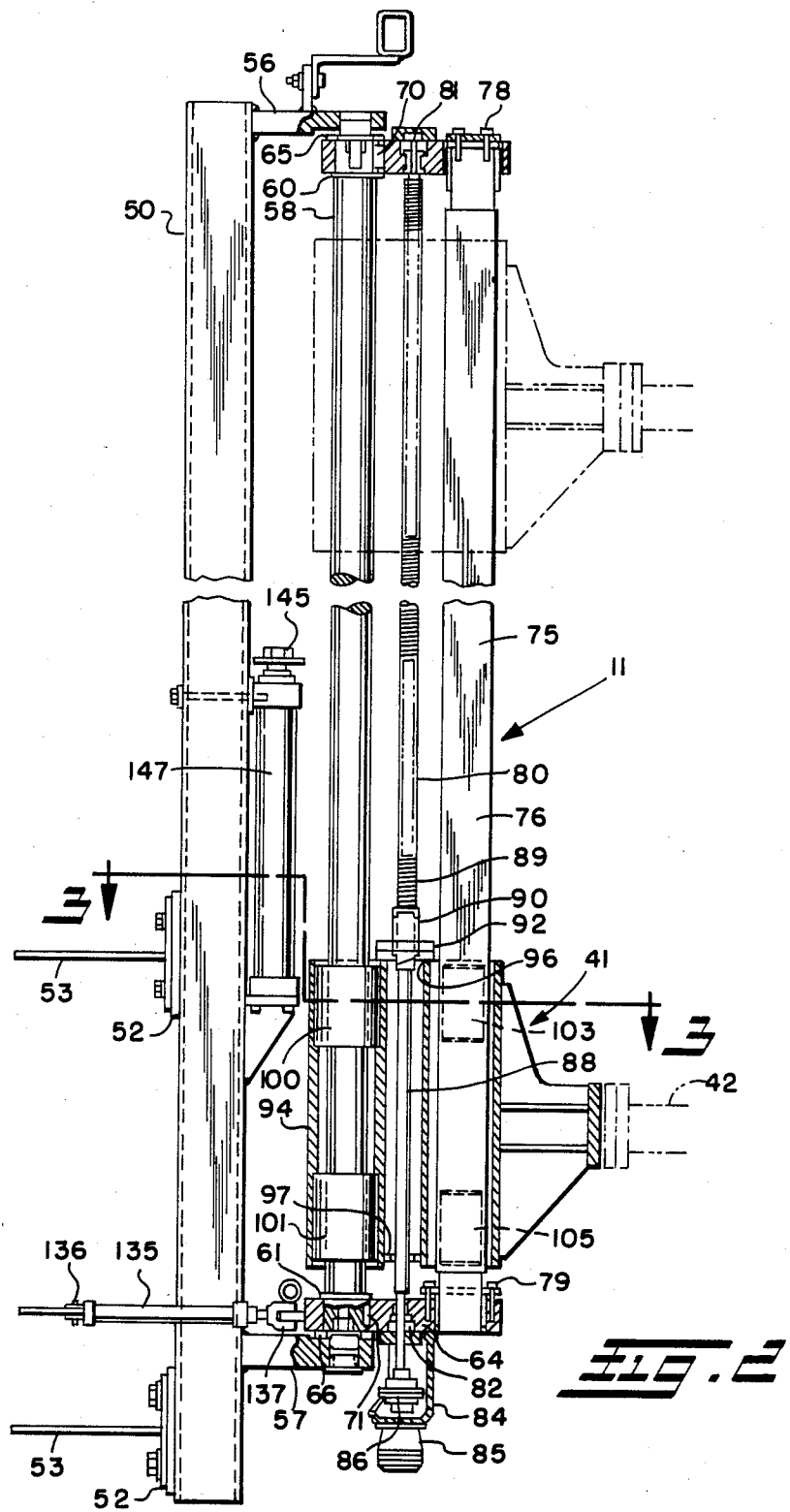

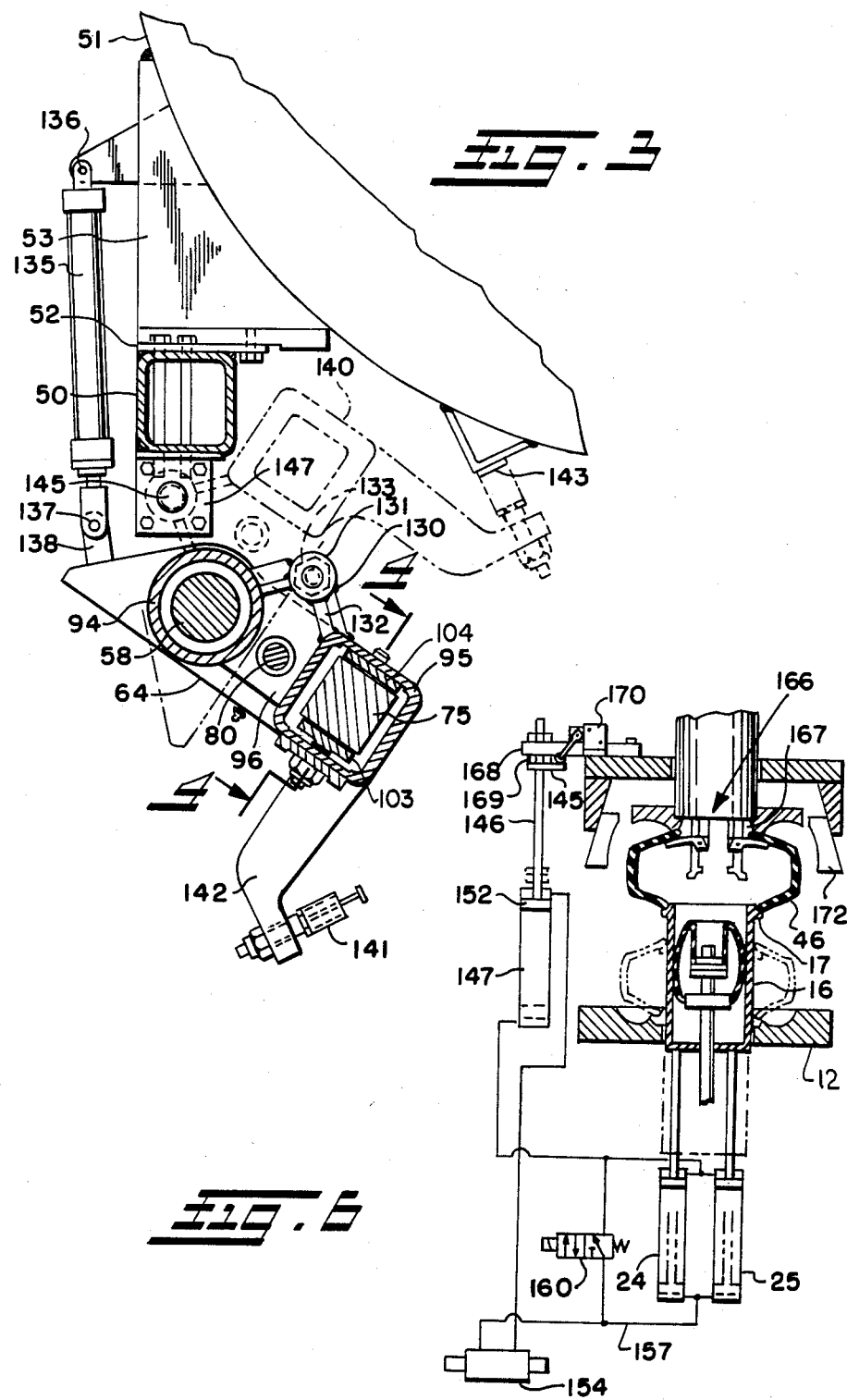

TIRE CURING PRESS AND LOADER

DISCLOSURE

This invention relates generally as indicated to a tire curing press and loader.

BACKGROUND OF THE INVENTION

This invention relates to certain improvements in tire presses of the type shown in prior U.S. Pat. Nos. 4,338,069 and 4,447,385. Such tire presses are representative of tire presses manufactured as sold by NRM Corporation of Columbiana, Ohio, under the well known trademark AUTOLOK.

More importantly, in U.S. Pat. No. 4,338,069 there is illustrated in some detail a loader for such press which utilizes parallel rods for vertically moving the loader basket and which includes a mechanism for synchronizing the movement of the loader with the bottom bead ring. Such mechanism involves a fairly complex cable assembly which was found to be adequate for its intended purpose. However, the cable assembly of such prior art presses was found to corrode in the field due to the steam-water environment of tire curing presses. The cable was also quite complex to adjust and was costly to manufacture and install.

Moreover, the loaders of such prior art patents were found difficult to manufacture with the required tolerances for precision loading since it was difficult to manufacture two parallel plumb rods for vertical movement of the horizontally extending loader frame. Such prior art constructions not only were expensive and difficult to manufacture and adjust, but also resulted in less than the desired concentricity and alignment in tire press loading. While satisfactory for some purposes, such prior art mechanisms were not completely satisfactory for both manufacturing economies and the desired results.

In any event it is desirable to have a loader or a tire press which will position the green tire in the proper relationship with an elevated bottom bead ring and which will move that green tire in synchronism with the vertical movement of that bottom bead ring. This is true whether the vertical movement of the green tire is accomplished by the loader itself moving in synchronism with the bottom bead ring or by a top loading mechanism in which the loader has transferred the green tire to the top bead ring which then moves in synchronism as the press closes with the bottom bead ring. It is also desirable to drive the loader with a power driven mechanism which may be stalled to be in synchronism with the vertical movement of the bottom bead ring.

Prior attempts to drive a loader by such mechanism such as shown in U.S. Pat. No. 4,391,769 or even to drive a bladder by such mechanism as shown in U.S. Pat. No. 4,368,015 have fallen far short of the requirements of the present invention. There have even been attempts to synchronize the shaping of the tire with the closing of the press head such as shown in U.S. Pat. No. 3,609,812 to Baier.

SUMMARY OF THE INVENTION

The present invention relates to a tire curing press with an improved loader and such press includes a shaping or center mechanism which includes a vertically movable well. The well acts as a housing for a shaping and curing bladder in its invaginated or retracted position and also supports on its upper edge the lower bead or toe ring for the tire. Vertical downward movement of the well also assists in the proper entry of the bladder into the green tire for shaping, and upward movement not only strips the cured tire from the lower mold section for unloading but also assists in removal of the bladder from the cured tire. At the conclusion of the cure cycle when the press is open the well and bottom bead ring are elevated and the bladder retracted.

The press includes a loader of improved design affording precision centering and accuracy which is driven for vertical movement by a ball screw and nut drive which positions the green tire concentric with the upper and lower mold sections and over the bottom bead ring. The loader then moves the green tire downwardly until the lower bead of the green tire reaches a predetermined point touching or fairly closely adjacent the elevated bead ring.

Simultaneously an adjustble pad on the loader contacts the tip of an extended rod of a vertically oriented synchronizer piston-cylinder assembly. Concurrently a sensor is tripped to power the synchronizer piston downwardly, and as such piston moves downwardly, the loader follows at a slightly higher speed causing the rotary motor of the ball screw drive to be retarded or stall thus keeping the loader against the tip of the rod of the synchronizer cylinder assembly. As the synchronizer cylinder assembly is being powered down, fluid on the underside of its piston is being forced over to the top ports of a pair of equal size bead lift cylinder assemblies causing them to bring the well and thus the lower bead ring down at the same speed as the loader is bringing down the tire. In this manner the green tire and lower bead ring are maintained in constant relationship until the bead ring is seated on the lower mold section.

The point of bead ring seating provides a physical stop which in turn blocks the synchronizer piston and rod, and thus the loader from further downward travel. This synchronization is accomplished by making the blind end area of the piston of the synchronizing cylinder twice the equal rod end areas of the pistons of the bead lift cylinders. During this synchronized movement, the shaping bladder is entering the tire to assume control of the tire permitting the loader to be released and removed.

After the cure cycle is completed and the press has opened, the bead lift cylinder assemblies are powered upwardly, initially to cause the cured tire to be stripped from the lower mold section and then to elevate the tire for unloading. As the bead lift cylinder assemblies are being powered upwardly, fluid from the rod end of such piston-cylinder assemblies is being forced to the bottom port of the synchronizer cylinder assembly causing its rod to extend and be in position for the next loading cycle.

After the bead lift cylinders have been stroked up, a valve is energized causing hydraulic fluid to flow under pressure to both sides of the bead lift cylinder pistons, and on the underside of the synchronizer piston. Because of the area difference, the pistons are caused to stroke completely upwardly, and at the same time regenerating any hydraulic fluid which may have been lost between the bead lift cylinder assemblies and the synchronizer assembly due to leakage at cylinder seals or line connections.

The loader itself also incorporates certain improvements. The loader basket arm is mounted on a horizontal frame which travels vertically on a vertically extending frame which is in turn mounted for swinging movement to position the loader basket aligned with a pick-up position and with the centerline of the press. The vertical frame includes a plum or pivot rod on which the horizontal loader basket frame is mounted with ball bushings. The vertical frame also includes a square or rectangular rod provided with only two parallel unfinished sides, such sides being on opposite sides of the swinging direction of the frame. The horizontal loader basket frame is supported on such finished sides by linear bearings or pads which are preloaded with respect to the horizontal loader basket frame. Belleville washers may be positioned adjustably to obtain such preload between such finished parallel sides and the horizontal loader arm frame. The vertical frame is driven for such vertical movement by a ball screw and nut assembly. The screw of such assembly may be driven by a rotary motor such as an air, hydraulic or an electric motor, but one which by preference is capable of stalling without damage. The vertical frame also includes an adjustable stop limiting swinging movement thereof.

In another embodiment involving what is know as top loading, the loader basket may grip or support the tire in a manner to leave the top bead free. In this manner the top bead of the tire may be engaged and brought into register with the top bead or toe ring of the press initially and then brought into proper position or register with the elevated bottom bead ring as the press closes. As the press closes, it is the press head which acts as the loader and which is synchronized with the vertical movement of the bottom bead ring. In such embodiment, the movement of the press head may actually overpower the rod of the synchronizing cylinder rather than be stalled thereagainst.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In the annexed drawings:

FIG. 1 is a schematic elevation in section of a preferred form of the present invention;

FIG. 2 is an enlarged elevation partially broken away and in section of a loader in accordance with the present invention;

FIG. 3 is a horizontal section of such loader taken substantially on the line 3—3 of FIG. 2;

FIG. 4 is a further enlarged vertical section taken substantially on the line 4—4 of FIG. 3;

FIG. 5 is a horizontal section also enlarged taken substantially on the line 5—5 of FIG. 4; and FIG. 6 is a view similar to FIG. 1 of a second embodiment of the present invention.

DETAILED DESCRIPTION OF THE PREFERRED EMBODIMENTS

Referring first to FIG. 1 there is illustrated a tire curing press shown generally at 10 and a loader shown generally at 11. Both the press and loader may be of the general type shown in prior U.S. Pat. Nos. 4,332,536 and 4,338,069. The presses and loaders of such patents are manufactured and sold by NRM Corporation of Columbiana, Ohio, U.S.A., under the trademark AUTOLOK.

The press includes top and bottom mold sections indicated at 12 and 13, respectively. The press is opened by the vertical movement of the press head supporting the top mold section by one or more fluid piston-cylinder assemblies, not shown. The upper mold section includes a top bead or toe ring 15 while the lower mold section includes a bottom bead or toe ring 16. The bottom bead ring is mounted on a vertically movable well 17 which serves several purposes. One purpose of course is to support the lower bead or toe ring 16 for vertical movement. Another is to house the shaping and curing bladder 19 of the center mechanism 20 in its invaginated or retracted condition as illustrated. The bladder, also as illustrated, includes relatively movable upper and lower bladder clamps actuated by the center mechanism.

The well 17 is supported for vertical movement on the rods 22 and 23 of equal size bead left piston-cylinder assemblies 24 and 25, respectively. Such piston-cylinder assemblies are double acting and hydraulically operated. Hydraulic fluid is supplied to the cylinders of such assemblies through upper and lower ports indicated generally at 26 and 27, respectively, on opposite sides of the respective pistons 29 and 30. As indicated, the lower mold section 12 is provided with a seat shown generally at 32 constituting a physical stop for the bead ring 16 in its lowermost position.

Loader 11 which is shown in more detail in FIGS. 2-5 includes generally a vertical frame 40, a horizontal frame 41 movable on the vertical frame, a loader arm 42 secured to the horizontal frame and a loader basket or chuck 43 mounted on the outer end of the loader arm. In the illustrated embodiment of FIG. 1, the loader basket or chuck 43 includes a plurality of chuck shoes 44 adapted to grip the inside upper edge of the top bead 45 of green tire 46. Again reference may be had to prior U.S. Pat. No. 4,338,069 for more detail of a loader chuck which may be used with the present invention.

In any event, it is the function of the loader to pick up a green tire from in front of the press from a pick-up position and properly to load that tire into the press for insertion of the shaping bladder and controlled closing of the press with proper control of the green tire being obtained by the center mechanism before the loader is returned to the tire pick-up position.

To achieve this purpose, the vertical frame of the loader is mounted for swinging movement about a vertical axis to align the loader chuck or basket with the pick-up position and the centerline of the press. Also, the horizontal frame of the loader is mounted for vertical movement along the vertical frame.

Referring now to FIGS. 2 and 3 it will be seen that the loader is mounted on a vertically extending tubular column 50 which is secured to the base of the press 51 through suitable brackets 52 mounted on horizontally extending gussets 53. Extending from the fixed column 50 are two horizontally extending ears 56 and 57 at the top anb bottom, respectively, in which are mounted the reduced diameter ends of vertically extending polished rod 58.

Such polished rod is shouldered top and bottom and provided with thrust washers seen at 60 and 61. On the reduced diameter portion of such rod beyond such thrust washers there is keyed a horizontally extending top and bottom arm seen at 63 and 64. Top and bottom beyond such arms there are provided thrust washers seen at 65 and 66, respectively, positioned between the arms 63 and 64 and the arms 56 and 57.

The arms 63 and 64 are keyed as indicated at 70 and 71 to the reduced diameter portions of the rod 58 so that the relatively short arms 63 and 64 of the vertical frame rotate with the vertical rod 58 about its vertical axis.

At the outer ends of the relatively short swing arms 63 and 64 there is mounted the ends of a vertically extending rectangular or square bar 75 which includes two parallel and finished opposite sides 76 and 77. The bar 75 is mounted top and bottom on the relatively short ears or legs of the vertical frame 63 and 64 by adjustable fasteners seen at 78 and 79 in FIG. 2.

Positioned between the polished rod 58 and the bar 75 is a ball screw 80 journaled in the top horizontal frame member 63 as indicated at 81 and in the bottom frame member 64 as indicated at 82. Positioned beneath the bottom frame member is a bracket 84 on which is mounted a rotary motor 85 driving the screw through coupling 86. The motor 85 may be a pneumatic, hydraulic or an electric rotary motor driving the screw 80 for controlled rotation.

Extending upwardly from the bottom frame 64 the screw is in the form of a plain shaft seen at 88. Such shaft forms the lower part of the screw which converts into screw portion 89 which extends through ball nut 90. The ball nut 90 is mounted on the upper end of horizontal frame 41 as indicated at 92 so that rotation of the screw 80 results in vertical movement of the horizontal frame 41. The horizontal frame as seen more clearly in FIG. 5 includes a cylindrical elongated vertical housing 94 and a rectangular generally parallel vertical housing 95. Such vertically extending housings are interconnected top and bottom by webs 96 and 97 to maintain the general parallelism thereof.

The horizontal frame housing 94 includes two vertically spaced ball bushings indicated at 100 and 101 riding on the polished rod 58. The horizontal frame rectangular housing 95 includes opposed linear bearing pads seen at 103 and 104 at the upper end of such frame housing and 105 and 106 at the lower end of such frame housing. Special reference may be had to FIG. 4. The bearing pads 104 and 106 are mounted on the interior of the wall of the tube 95 by fasteners 110, and on the opposite wall of the tube 95 by means of fasteners 111 and 112, respectively, which extend both through the tube wall and through pads 113 and 114 secured to the exterior of such wall so that the bearing pads are mounted for slight movement toward and away from the finished surface 76. The fasteners 111 and 112 are threaded into the bearing pads while being movable through the tube wall and the associated pad on the exterior of the wall. Conversely, threaded into the tube wall and the associated exterior pad are adjustable studs 116 and 117 for the pad 103, and 118 and 119 for the pad 105. Each of the studs includes an interior shoulder 121 and an interior reduced diameter cylindrical projection 122 fitted in an associated hole in the respective bearing pad. Positioned between each shoulder and the exterior of th bearing pad, surrounding such projection is a belleville washer spring assembly 123. Such spring assemblies urge the respective bearing pads 103 and 105 toward the finished surface 76. The pressure of the spring assemblies and thus the loading of the bearing pads against such surface may be altered simply by loosening the lock nuts 125 and rotating the threaded studs 116-119 in their tapped holes in the pads and associated tube wall.

The top web or plate 96 interconnecting the tubes 94 and 95 is offset as indicated at 130 in FIG. 3 and at such offset is provided with a vertically extending hub 131 rigidified by vertically extending gussets 132. The hub adjustably supports a downwardly extending contact pad 133.

Swinging of the vertical frame about the vertical axis of rod 58 is obtained by piston-cylinder assembly 135, the blind end of which is pivoted at 136 to the base of the press while the rod is pivotally connected at 137 to extension 138 of the bottom frame 64. When the piston-cylinder assembly extends, the frame will pivot to the phantom line position seen at 140 in FIG. 3 with the limit of such movement being obtained by adjustable stop and shock absorber 141 mounted on arm 142 of the frame 64. The adjustable stop engages pad 143 on the base of the press. In this manner the piston-cylinder assembly 135 swings the loader from the full line pick-up position to the phantom line press loading position seen at 140 and in such position the adjustable downwardly extending pad 133 is brought into alignment with pad 145 on the upwardly extending rod 146 of piston-cylinder assembly 147 which is mounted on the column 50.

Reverting now to FIG. 1 it will be seen that the vertically extending piston-cylinder assembly 147 includes a top cylinder port 150 and a bottom cylinder port 151 on opposite sides of the piston 152. The top port 150 is connected to bead lift control valve 154 through line 155. The bottom port 151 is connected to the top ports of the bead lift cylinders 24 and 25 through line 156. The bottom ports of the bead lift cylinders are connected to the bead lift valve 154 through line 157.

In operation, with the press open and the bead ring 16 elevated the loader swings the green tire 46 into a loading position in alignment with the press centerline. At this point the loader now starts to move downwardly until the lower bead of the green tire reaches a predetermined point touching or fairly closely adjacent the elevated bead ring 16. Simultaneously the adjustable pad 133 on the loader contacts the tip 145 of the rod of synchronizer cylinder assembgly 147. Concurrently, limit switch 159 is tripped causing valve 154 to shift to power the synchronizer cylinder piston 152 downwardly. The loader being driven downwardly by the motor 85 follows at a slightly higher speed causing the motor 85 of the ball screw drive to be retarded or stall thus keeping the loader against the tip of the rod 146. As the synchronizer cylinder assembly 147 is being powered down, fluid from the bottom port 151 is being forced over to the top ports 26 of the bead lift cylinder assemblies 24 and 25 through line 156. This causes the rods 29 and 30 of the bead lift cylinder assemblies to move downwardly bringing the bead ring 16 also downwardly at the same speed as the loader is bringing the green tire down. In this manner the green tire and the lower bead ring 16 are being maintained in constant relationship until the bead ring is seated on the lower mold section 12.

The point of bead ring seating provides a physical stop which in turn blocks further downward movement of the synchronizer piston 152, and thus blocks the loader from further downward travel. Such synchronization is accomplished by making the blind end area of the piston 152 of the synchronizing cylinder assembly 147 equal to the rod end areas of the pistons of the equal size bead lift cylinders. Thus the rod end areas of the pistons 29 and 30 are each one-half of the blind end area of the piston 152. During the downward synchronized movement, the shaping bladder 19 is entering the tire to assume control of the tire permitting the loader to be released and removed when the bead ring 16 seats on the bottom mold section 12. After the bladder has properly entered the tire the loader is removed and the press then closes for the cure cycle.

It will be appreciated that more than two bead lift cylinder assemblies may be employed. In such case, the rod end areas of the equal bead lift pistons will be the reciprocal of the number of such bead lift pistons employed compared to the blind end area of the synchronizer piston.

After the cure cycle is completed and the press has opened, the bead lift cylinder assemblies are powered upwardly by the valve 154. Fluid from the rod end of the pistons 29 and 30 moves through line 156 moving the piston 152 up also. The elevation of the bead lift cylinder assemblies intially causes the cured tire to be stripped from the lower mold section 12 and then to elevate for unloading.

After the bead lift cylinders have been stroked up, valve 160 is energized causing hydraulic fluid to flow under pressure to both sides of the bead lift cylinder pistons 29 and 30 and also to the underside of the synchronizer piston 152. Because of the area difference the pistons are caused to stroke completely upwardly, and at the same time any hydraulic fluid which may have been lost between the bead lift cylinder assemblies and the synchronizer cylinder assembly due to leakage at cylinder seals or line connections is regenerated.

In FIG. 6 there is illustrated another embodiment of the present invention utilizing a technique known as top loading. In such technique, the loader basket engages the green tire in the tread area leaving the top bead free to be picked up and held by a chuck assembly shown generally at 166 in the press head. In this manner the green tire is centered intially with respect to the top bead ring 167 and is held in such suspended fashion as the press begins to close. An arm 168 mounted on the press head includes an adjustable pad 169. As the pad descends it contacts the tip 145 of rod 146 of the synchronizer cylinder assembly 147 when the lower bead of the green tire is adjacent or in close proximity to the elevated bead ring 16. Simultaneously a limit switch 170 is tripped to shift valve 154 to power the piston 152 downwardly with the pistons 29 and 30 moving at the same speed. The press head follows thus synchronizing the downward motion of the loader in the press head with the bottom bead ring during the loading cycle of the press. It is noted that the press illustrated schematically in FIG. 6 also includes a sectional mold mechanism 172 which may of course be used in either embodiment. In any event synchronization of the green tire moving downwardly with the bottom bead ring is obtained in a simplified and convenient manner.

Although the invention has been shown and described with respect to certain preferred embodiments, it is obvious that equivalent alterations and modifications will ocur to others skilled in the art upon the reading and understanding of this specification. The present invention includes all such equivalent alterations and modifications, and is limited only by the scope of the following claims.

We claim:

1. A tire press having top and bottom mold sections and a loader therefor, said tire press including a fluid power operated vertically movable bottom bead ring, said loader including means to move a green tire vertically in alignment with said bottom bead ring, when elevated and fluid power control means operative to synchronize the movement of said bottom bead ring and the loader after the loader has positioned the green tire with its bottom bead in close proximity to the bottom bead ring, said fluid power control means comprising a synchronizer piston-cylinder assembly and piston-cylinder means operative to move said bottom bead ring, and fluid passage means directly interconnecting said synchronizer piston-cylinder assembly and said piston-cylinder means causing said synchronizer piston-cylinder assembly and said piston-cylinder means to act together to cause the green tire and bottom bead ring to move downwardly in unison.

2. A tire press as set forth in claim 1 wherein said piston-cylinder means comprises a plurality of piston-cylinder assemblies, the rods of which are connected to the bottom bead ring.

3. A tire press as set forth in claim 2 wherein a chuck holds the green tire for such vertical movement and includes an abutment movable therewith operative to engage the tip of the piston of the synchronizer piston-cylinder assembly.

4. A tire press as set forth in claim 3 wherein said fluid passage means includes an a hydraulic connection between the blind end of the cylinder of the synchronizer piston-cylinder assembly and the rod end of piston-cylinder assemblies connected to the bottom bead ring.

5. A tire press as set forth in claim 4 wherein the blind end area of the piston of the synchronizer piston-cylinder assembly is equal to the rod end area of the pistons of the piston-cylinder assemblies connected to the bottom bead ring.

6. A tire press as set forth in claim 5 wherein the blind end area of the piston of the synchronizer piston-cylinder assembly is proportional to the rod end area of each piston of the piston-cylinder assemblies connected to the bottom bead ring as the reciprocal of the number of such piston-cylinder assemblies employed.

7. A tire press as set forth in claim 1 wherein said loader is mounted at least in part in the top mold section.

8. A tire press as set forth in claim 7 wherein said top mold section includes a chuck for holding the green tire by the upper bead.

9. A tire press as set forth in claim 8 wherein said top mold section includes a top bead ring, said chuck being operative to center and hold the green tire with respect to said top bead ring before the green tire has been positioned in close proximity to the bottom bead ring.

10. A tire press as set forth in claim 9 wherein said piston-cylinder means comprises a plurality of piston-cylinder assemblies, the rods of which are connected to the bottom bead ring.

11. A tire press as set forth in claim 10 wherein the chuck holding the green tire for such vertical movement includes an abutment movable therewith operative to engage the tip of the piston of the synchronizer piston-cylinder assembly.

12. A tire press as set forth in claim 11 wherein said fluid passage means includes an a hydraulic connection between the blind end of the cylinder of the synchronizer piston-cylinder assembly and the rod ends of piston-cylinder assemblies connected to the bottom bead ring.

13. A tire press as set forth in clim 12 wherein the blind end area of the piston of the synchronizer piston-cylinder assembly is equal to the rod end area of the pistons of the piston-cylinder assemblies connected to the bottom bead ring.

14. A tire press as set forth in claim 13 wherein the blind end area of the piston of the synchronizer piston-cylinder assembly is proportional to the rod end area of each piston of the piston-cylinder assemblies connected to the bottom bead ring as the reciprocal of the number of such piston-cylinder assemblies employed.

15. A tire press as set forth in claim 1 including a vertical frame, a loader chuck, a horizontal frame on which said loader chuck is mounted, means mounting said horizontal frame for vertical movement on said vertical frame, means to swing said vertical frame about a vertical axis to position the loader chuck in vertical alignment with a tire pick-up position and a press loading position and vice versa, said vertical frame comprising a vertically extending polished rod and a generally parallel rectangular bar, only two sides of which are parallel and finished, said horizontal frame including bearings engaging the rod and the two finished sides of said bar.

16. A tire press as set forth in claim 15 including a ball screw and nut supporting said horizontal frame for vertical movement.

17. A tire press as set forth in claim 16 including bearing pads on said horizontal frame engaging the opposite finished sides of said bar, and means adjustably to load said pads.

18. A tire press as set forth in claim 17 including adjustable springs urging the pads on one side of said bar toward the respective finished surface.

19. A tire press as set forth in claim 18 wherein said springs are velleville washers, the loading of which may be adjusted.

20. A tire press as set forth in claim 16 including a rotary motor driving said screw for rotation.

21. A tire press as set forth in claim 20 wherein said synchronizer piston-cylinder assembly is a vertically extending fluid piston-cylinder assembly having a vertically extending rod, and an abutment on said horizontal frame operative to engage the tip of said last mentioned rod when said loader is in a press loading position and descends.

22. A tire press as set forth in claim 21 including means to power said last mentioned rod downwardly at a speed slower than the vertical movement of the horizontal frame whereby said rotary motor will be retarded maintaining the horizontal frame abutment in engagement with the tip of said last mentioned rod.

23. A tire press as set forth in claim 22 including means responsive to the engagement of said abutment with the tip of said last mentioned rod to powewr said last mentioned rod downwardly.

24. A tire press as set forth in claim 1 including means to regenerate hydraulic fluid on both the blind and rod ends of the synchronizer piston-cylinder asembly and said piston-cylinder means causing both fully to extend once every cycle of the press.

25. A loader for a tire curing press comprising a vertical frame, a loader chuck, a horizontal frame on which said loader chuck is mounted, means mounting said horizontal frame for vertical movement on said vertical frame, means to swing said vertical frame about a vertical axis to position the loader chuck in vertical alignment with a tire pick-up position and a press loading position and vice versa, said vertical frame comprising a vertically extending polished rod and a generally parallel rectangular bar, only two opposite sides of which are parallel and finished, said opposite sides being in planes parallel to the axis of said polished rod and a bearing on said horizontal frame engaging the rod and adjustably loaded bearings on said horizontal frame engaging the two opposite finished sides of said bar to facilitate movement of the horizontal frame by said means for vertical movement therof in order to achieve loader accuracy.

26. A loader as set forth in claim 25 including a ball screw and nut supporting said horizontal frame for vertical movement.

27. A loader as set forth in claim 26 wherein said bearings engaging said bar are bearing pads on said horizontal frame engaging the opposite finished sides of said bar.

28. A loader as set forth in claim 27 including adjustable springs urging the pads on one side of said bar toward the respective finished surface.

29. A loader as set forth in claim 28 wherein said springs are belleville washers, the loading of which may be adjusted.

30. A loader as set forth in claim 26 including a rotary motor driving said screw for rotation.

31. A loader as set forth in claim 30 including a vertically extending fluid piston-cylinder assembly having a vertically extending rod, and an abutment on said horizontal frame operative to engage the tip of said last mentioned rod when said loader is in a press loading position and descends.

32. A loader as set forth in claim 31 including means to power said last mentioned rod downwardly at a speed slower than the vertical movement of the horizontal frame whereby said rotary motor will be retarded maintaining the horizontal frame abutment in engagement with the tip of said last mentioned rod.

33. A loader as set forth in claim 32 including means responsive to the engagement of said abutment with the tip of said last mentioned rod to power said last mentioned rod downwardly.

* * * * *